March 12, 1963  W. S. BECKMAN  3,080,698
FRUIT AND NUT GATHERER
Filed May 23, 1960  2 Sheets-Sheet 2
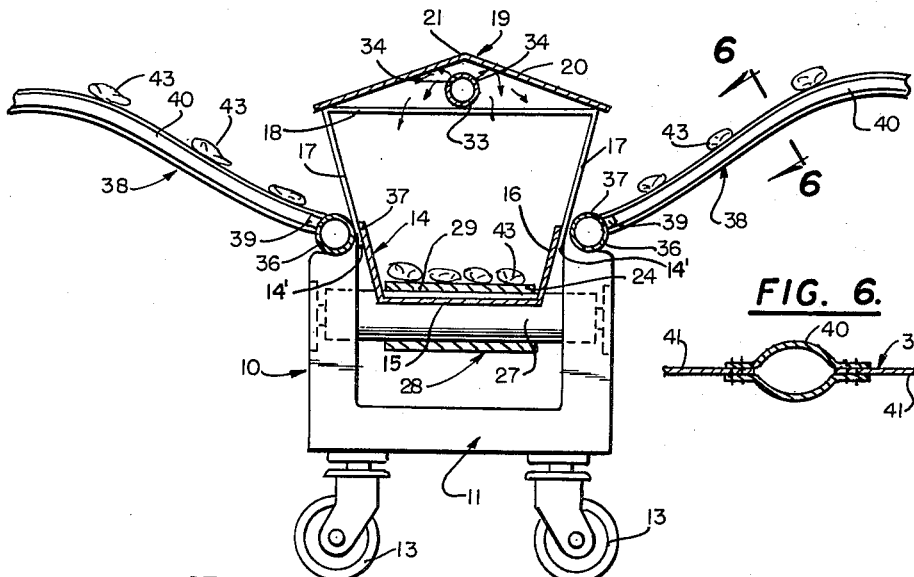
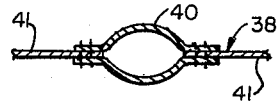
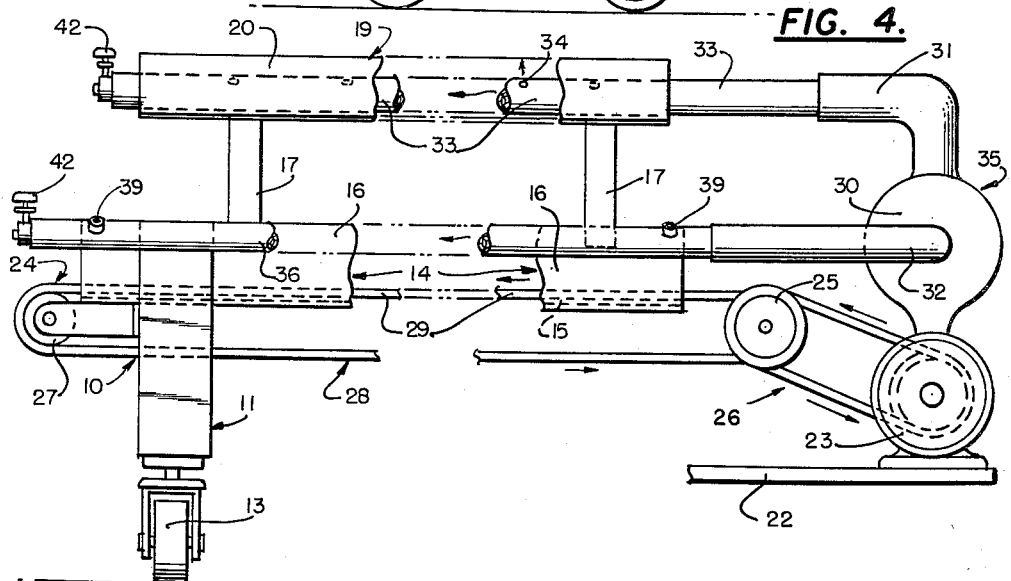
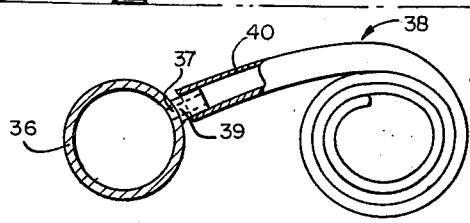
INVENTOR.
Walter S. Beckman
BY *Victor J. Evans & Co.*
ATTORNEYS

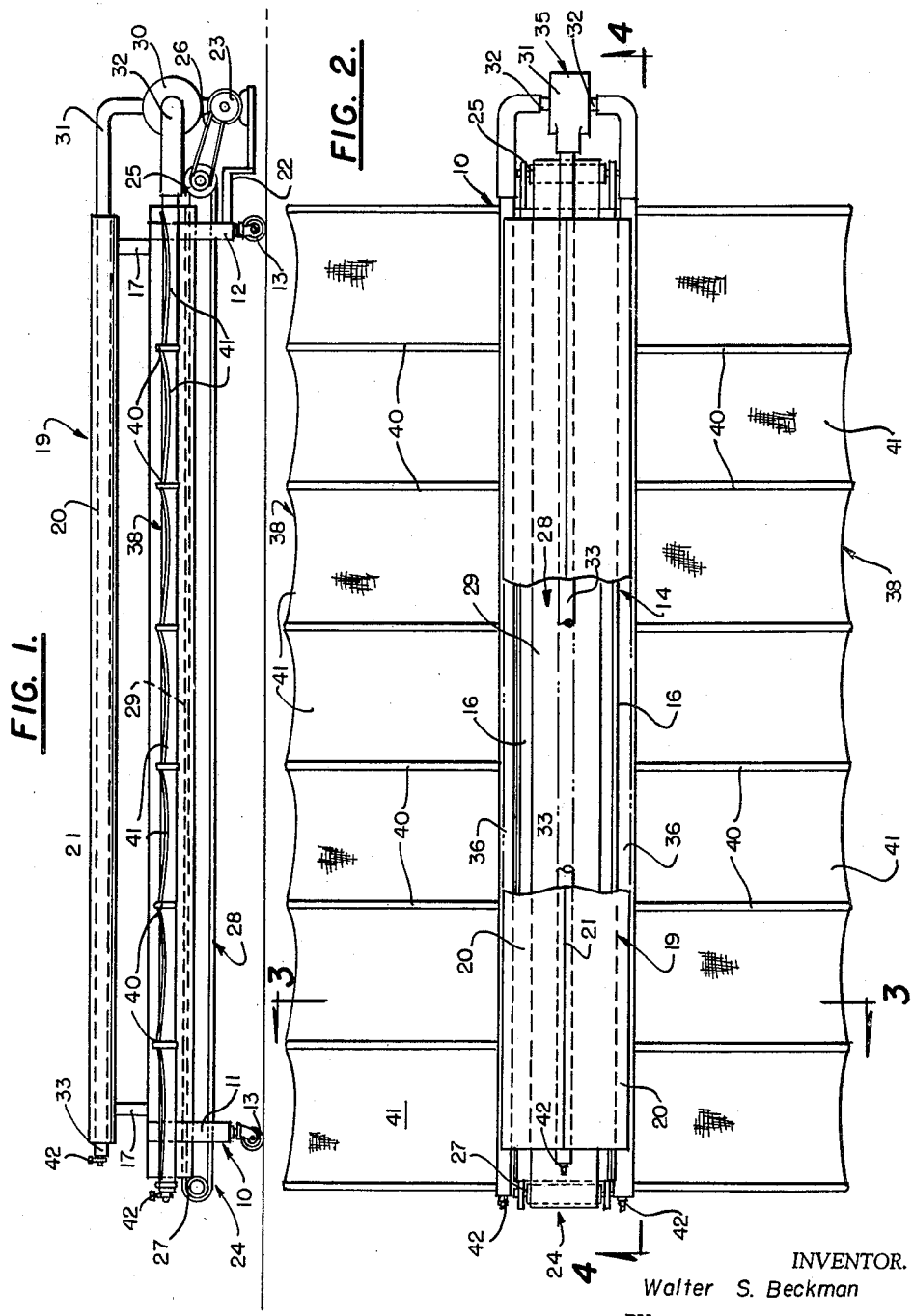

United States Patent Office 3,080,698
Patented Mar. 12, 1963

3,080,698
FRUIT AND NUT GATHERER
Walter S. Beckman, Rte. 2, Box 98, Exeter, Calif.
Filed May 23, 1960, Ser. No. 31,012
1 Claim. (Cl. 56—328)

This invention relates to a means for gathering fruits and nuts which are shaken from trees.

The object of the invention is to provide a fruit and nut gatherer which consists of a mobile unit that can be conveniently positioned at a desired location such as beneath the branches of fruit and nut trees so that when the branches are shaken, the fruit and nuts will fall downwardly by gravity onto guide members and wherein the fruit or nuts will then be guided onto a conveyor so that the articles can be conveyed to a suitable waiting receptacle, vehicle or the like, so that the harvesting and gathering of such fruits and nuts will be greatly facilitated.

Another object of the invention is to provide a fruit and nut gatherer which includes means for automatically and readily separating the leaves and debris from the fruit or nuts, and wherein the present invention also includes guide members that can be readily extended or retracted so that for example when the device is being moved from place to place, or when the device is not being used, the guide members are adapted to be arranged in a folded compact arrangement, in order to occupy a minimum amount of space and wherein when the fruit, nuts or the like are being gathered, the guide members are moved to an extended position in order to insure that all of the fruit or nuts which are shaken from the trees will be received and gathered and guided into the proper location.

A further object of the invention is to provide a fruit and nut gatherer which is extremely simple and inexpensive to manufacture.

Other objects and advantages of the invention will be apparent during the course of the following description.

In the accompanying drawings, forming a part of this application, and in which like numerals are used to designate like parts throughout the same:

FIGURE 1 is a side elevational view of the fruit or nut gatherer of the present invention.

FIGURE 2 is a top plan view.

FIGURE 3 is a sectional view taken on the line 3—3 of FIGURE 2.

FIGURE 4 is a sectional view taken on the line 4—4 of FIGURE 2.

FIGURE 5 is a fragmentary sectional view on an enlarged scale showing tubes in collapsed condition and illustrating certain constructional details of the present invention.

FIGURE 6 is a sectional view on an enlarged scale taken on the line 6—6 of FIGURE 3.

Referring in detail to the drawings, the numeral 10 indicates the fruit or nut gatherer of the present invention which is shown to comprise a mobile frame that can be readily moved or located at a desired location, as for example the unit can be arranged beneath the branches of fruit, nut trees or the like. As shown in the drawings, there is provided a par of spaced parallel vertically disposed U-shaped support members 11 and 12 which generally have the same formation. The numeral 13 indicates wheels mounted below the support members 11 and 12, and these wheels permit the device to be readily moved along the ground to the desired location.

There is further provided a hopper or trough which is indicated generally by the numeral 14 and the hopper 14 includes a horizontally disposed bottom wall 15 as well as a pair of spaced apart inclined side walls 16, FIGURE 3. The walls 16 of the hopper 14 may be secured to the support members 11 and 12 in any suitable manner, as for example by welding as at 14' in FIGURE 3. Braces 17 extend upwardly from the side walls 16 and are secured thereto, and horizontally disposed cross pieces 18 extend between the upper ends of the braces 17. The numeral 19 indicates a hood which is mounted above the cross pieces 18, and the hood 19 includes a pair of angularly arranged top sections 20, the numeral 21 indicating the apex of the hood.

Secured to the support member 12 is a platform 22 which has a power source such as the engine or motor 23 supported thereon. The numeral 24 indicates a conveyor which includes a drive roll 25 that may be operatively connected to the engine 23 as for example by means of a belt drive 26. The conveyor 24 further includes an idle roll 27 and the numeral 28 indicates the wide endless belt of the conveyor 24, the conveyor 28 including a horizontal portion 29 which is mounted for travel or movement longitudinally through the hopper 14 just above the bottom wall 15, as for example as shown in FIGURE 3.

The numeral 30 indicates an air blower or fan which is operated by the engine 23, and a fitting 35 is connected to the blower 30, the fitting 35 including a plurality of air outlets 31 and 32. The numeral 33 indicates a first horizontally disposed tube or conduit which is connected to the air outlet 31, and the tube 33 is arranged just below the apex 21 of the hood 19, and the tube 33 may be supported on the cross pieces 18. As shown in the drawings, the tube 33 is provided with a plurality of spaced apart opposed upwardly directed apertures 34 whereby air from the tube 33 will be directed up against the portions 20 of the hood 19 and this air will then follow the direction of the arrows in FIGURE 3 so that this air can be used for helping to blow away leaves, debris or other foreign matter from the fruit or nuts being gathered.

Extending across the upper ends of the support members 11 and 12 and secured thereto in any suitable manner, as for example by welding, is a pair of spaced parallel horizontally dsposed aligned tubes 36, and these tubes 36 are provided with a plurality of apertures or openings 37 therein. A guide member 38 is provided for each of the tubes 36, and the guide members 38 are adapted to be extended or retracted pneumatically, as later described in this application. Thus, when the guide members 38 are not being used, they are adapted to be arranged in a compact formation as for example in the rolled formation shown in FIGURE 5, and when the guide members 38 are being used they are in the extended position of FIGURE 3.

The guide members 38 each include a plurality of spaced parallel flexible conduits 40 which are connected to the apertures 37 through the medium of fittings 39. Flexible body portions 41 serve to connect the tubes 40 together.

The ends of the tubes 33 and 36 are provided with valve mechanisms 42 by means of which the pressure of the air in the tubes 33 and 36 is controlled and therefore the pressure of air in the tubes or conduits 40 also is controlled. Opening the valve 42 in the tube 33, for instance, lowers the pressure in the tube 33 and permits collapse or recoil of the associated tubes 40.

In FIGURE 3 the numeral 43 indicates the article such as the fruit or nuts which are being gathered.

From the foregoing, it is apparent that there has been provided a machine or apparatus which is especially suitable for use in gathering articles such as fruit and nuts which are being shaken from trees in orchards or the like.

According to the present invention, it will be seen that when the fruit or nuts are being gathered or harvested, the machine 10 is moved into a position beneath the branches of the tree, and the wheels 13 permit the unit 10 to be readily moved to the desired location. The engine or motor 23 may be of the conventional gasoline type, and it will be seen that with the parts arranged as shown in the drawings, by actuating the motor 23, the belt drive 26 will transmit power from the motor 23 to the conveyor 24 so that for example the endless belt 28 will travel in a counterclockwise direction, FIGURE 1.

In addition, it is to be noted that when the device is being moved from place to place, or when the device is not being used, the guide members 38 will occupy a folded or rolled position or collapsed position as shown in FIGURE 5. This is due to the fact that the members 38 are each molded to the coiled form and in the absence of air pressure therein retain the coiled position. However, when the blower 30 is operated, some of the air under pressure from the blower will be directed outwardly to the outlets 32 and this air will enter the adjacent ends of the pair of lower tubes 36, and this air will then pass outwardly through the apertures 37 and enter the tubes 40 through the fittings 39. This air entering the tubes 40 will cause the tubes 40 to move from their recoiled positions as shown in FIGURE 5 to the extended generally inclined upright position shown in FIGURE 3, the tubes 40 being made of a suitable flexible material such as a suitable plastic. The ends of the body portions 41 are connected by suitable means such as adhesive (not shown) to the adjacent tubes 40 and when the tubes 40 extend and recoil, the body portions 41 unroll and roll up, respectively, on themselves. When fruit or nuts are being gathered, the parts such as the guide members 38 are in the extended or expanded position as shown in FIGURE 3 so as to provide a wide gathering surface whereby the nuts or fruits which are shaken from the limbs or branches of the tree will be received on the guide members 38.

Minor changes in shape, size and rearrangement of details coming within the field of invention claimed may be resorted to in actual practice, if desired.

What is claimed is:

In a device of the character described, a mobile frame including a pair of spaced parallel vertically disposed U-shaped support members, wheels mounted below said support members, a hopper connected to said support members and said hopper including a horizontally disposed bottom wall and spaced apart inclined side walls, vertically disposed braces extending upwardly from said hopper, horizontally disposed cross pieces connected to said braces, a hood supported above said cross pieces, said hood comprising angularly arranged top sections, a platform connected to one of said support members, an engine supported on said platform, a conveyor driven by said engine and including an endless belt having a portion thereof mounted for travel above the bottom wall of said hopper, an air blower operated by said engine, a plurality of air outlets connected to said blower, a first horizontally disposed tube connected to one of said outlets and said tube being positioned contiguous to the lower central portion of said hood, there being a plurality of spaced apart apertures in the upper portions of said tube; a pair of horizontally disposed spaced parallel aligned tubes extending across said support members and said last named tubes being connected to the said air outlets of said blower, said last named tubes each having a plurality of spaced apart apertures therein, and a pair of pneumatically operated extensible guide members connected to said last named tubes, each of said guide members including spaced parallel flexible conduits operatively connected to the apertures in the last named tubes, and flexible body portions connected to said conduits.

References Cited in the file of this patent
UNITED STATES PATENTS

| | | |
|---|---|---|
| 1,962,668 | Olney | June 12, 1934 |
| 2,212,128 | Richter | Aug. 20, 1940 |
| 2,386,881 | Phillips | Oct. 16, 1945 |
| 2,499,037 | Roles | Feb. 28, 1950 |
| 2,851,270 | Ball | Sept. 9, 1958 |